United States Patent
Rothman et al.

(10) Patent No.: US 10,612,794 B2
(45) Date of Patent: *Apr. 7, 2020

(54) CONTROLLED HYDRONIC DISTRIBUTION SYSTEM

(71) Applicant: BELIMO HOLDING AG, Hinwil (CH)

(72) Inventors: Nathan F. Rothman, Mercer Island, WA (US); Ian Dempster, Seattle, WA (US)

(73) Assignee: BELIMO HOLDING AG, Hinwil (CH)

( * ) Notice: Subject to any disclaimer, the term of this patent is extended or adjusted under 35 U.S.C. 154(b) by 13 days.

This patent is subject to a terminal disclaimer.

(21) Appl. No.: 15/729,546

(22) Filed: Oct. 10, 2017

(65) Prior Publication Data

US 2018/0156472 A1 Jun. 7, 2018

Related U.S. Application Data

(60) Continuation of application No. 14/930,348, filed on Nov. 2, 2015, now Pat. No. 9,810,438, which is a (Continued)

(51) Int. Cl.
*F24D 19/10* (2006.01)
*F04B 49/06* (2006.01)
(Continued)

(52) U.S. Cl.
CPC ........ *F24D 19/1033* (2013.01); *F04B 49/065* (2013.01); *F24D 19/1012* (2013.01);
(Continued)

(58) Field of Classification Search
CPC ............ F24D 19/1033; F24D 19/1012; F24D 19/1015; F04B 49/065; G05B 15/02
See application file for complete search history.

(56) References Cited

U.S. PATENT DOCUMENTS 5,425,503 A  6/1995  Corso
5,540,555 A  7/1996  Corso
(Continued)

OTHER PUBLICATIONS

Lu, L., "A New Approach to Set Point Control in Chilled Water Loops," 2002, International Refrigeration and Air Conditioning Conference.
(Continued)

*Primary Examiner* — Vincent H Tran
(74) *Attorney, Agent, or Firm* — Sughrue Mion, PLLC (57) ABSTRACT

A hydronic distribution system includes self-regulating valves networked together and operable to share valve temperature and valve position information with a microprocessor or other type of controller. The microprocessor runs one or more algorithms that process the temperatures and positions of the valves and then computes a desired speed for one or more variable speed pumps within the system. Controlling the pumps to operate at the desired speed and still maintain the correct amount of process fluid flow needed by the system reduces the overall energy use of the hydronic distribution system, saves on the operational lives of the pumps, and increases system efficiency.

5 Claims, 5 Drawing Sheets

Related U.S. Application Data division of application No. 13/219,481, filed on Aug. 26, 2011, now abandoned.

(51) Int. Cl.
| | | |
|---|---|---|
| *G05B 15/02* | (2006.01) | |
| *F04D 15/02* | (2006.01) | |
| *F25D 17/02* | (2006.01) | |
| *F24F 11/36* | (2018.01) | |

(52) U.S. Cl.
CPC ......... *F24D 19/1015* (2013.01); *G05B 15/02* (2013.01); *F04D 15/029* (2013.01); *F24F 11/36* (2018.01); *F25D 17/02* (2013.01); *Y02B 30/745* (2013.01); *Y10T 137/8158* (2015.04); *Y10T 137/85978* (2015.04)

(56) References Cited

U.S. PATENT DOCUMENTS

| | | | |
|---|---|---|---|
| 5,946,926 A | 9/1999 | Hartman | |
| 5,966,954 A | 10/1999 | Arima et al. | |
| 6,352,106 B1 | 3/2002 | Hartman | |
| 9,810,438 B2 * | 11/2017 | Rothman | F24D 19/1012 |
| 2003/0219342 A1 * | 11/2003 | Curry | F04D 19/04 417/44.1 |
| 2005/0039904 A1 | 2/2005 | Aler | |
| 2006/0021340 A1 * | 2/2006 | Vigholm | F15B 21/042 60/456 |
| 2008/0053115 A1 * | 3/2008 | Trantham | F24D 19/1015 62/118 |
| 2009/0020173 A1 | 1/2009 | Lau | |
| 2009/0304521 A1 | 12/2009 | Kernan | |
| 2010/0089339 A1 | 4/2010 | Krause et al. | |
| 2014/0372164 A1 | 12/2014 | Egan et al. | |
| 2015/0045982 A1 | 2/2015 | Egan et al. | |
| 2015/0293505 A1 | 10/2015 | Gonzalez | |

OTHER PUBLICATIONS

Hartman, Thomas, "Design Issues of Variable Chilled-Water Flow Through Chillers," ASHRAE.

Notice of Allowance, U.S. Appl. No. 14/930,348, dated Aug. 23, 2017, 14 pages.

Non-Final Office Action, U.S. Appl. No. 13/219,481, dated Dec. 18, 2013, 14 pages.

Final Office Action, U.S. Appl. No. 13/219,481, dated Jul. 17, 2014, 11 pages.

Non-Final Office Action, U.S. Appl. No. 13/219,481, dated Jan. 29, 2015, 10 pages.

* cited by examiner

CONTROLLED HYDRONIC DISTRIBUTION SYSTEM

PRIORITY CLAIM

This application is a continuation of U.S. patent application Ser. No. 14/930,348 filed on Nov. 2, 2015, which is a divisional of U.S. patent application Ser. No. 13/219,481, filed on Aug. 26, 2011, which applications are hereby incorporated by reference in their entireties as if fully set forth herein.

FIELD OF THE INVENTION

The present invention generally relates to systems and methods for networking a series of valves operating in a hydronic distribution system and also controlling the valves with a microprocessor that communicates flow and temperature information to variable speed pumps.

BACKGROUND OF THE INVENTION

Figure 1:
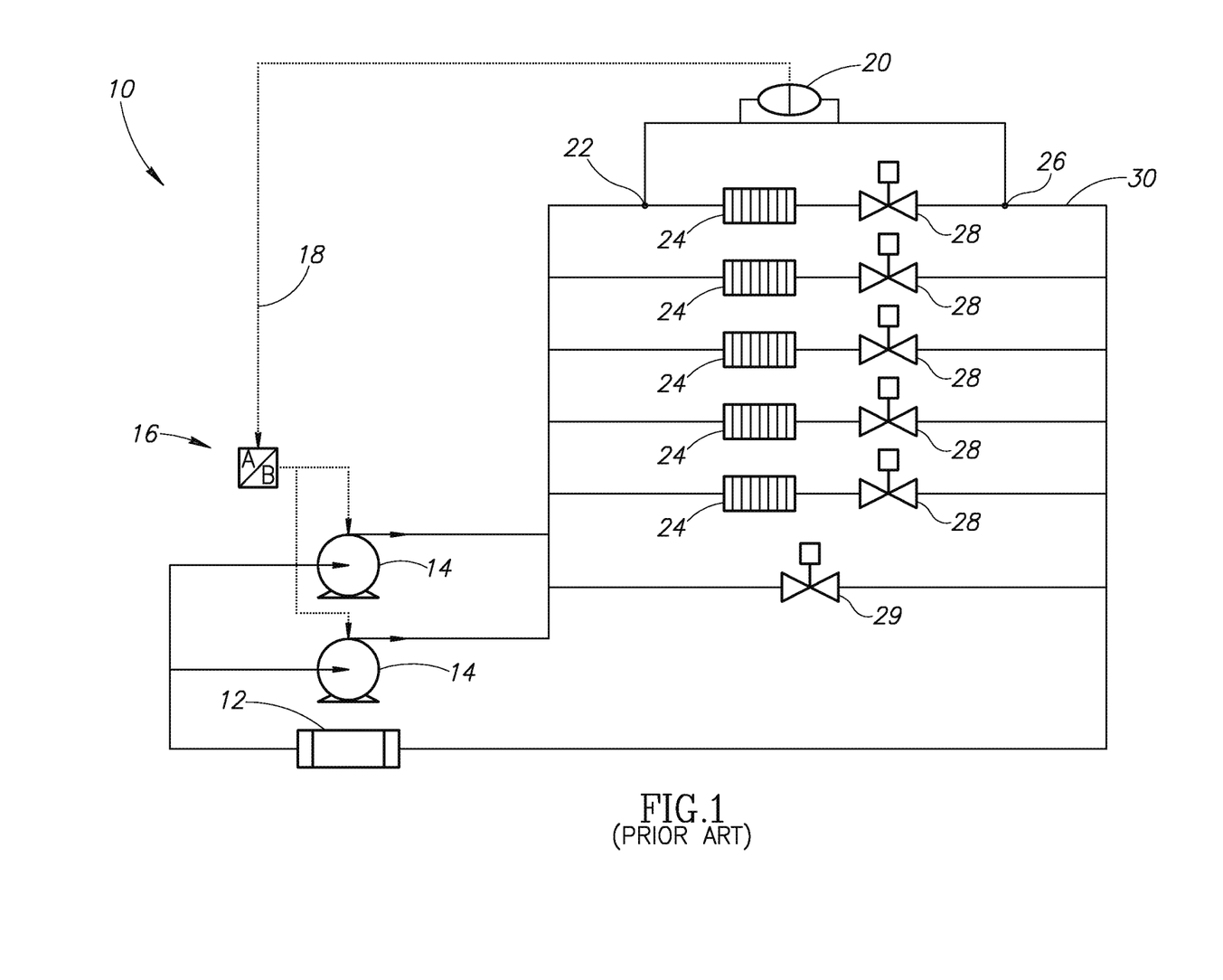
FIG. 1 is a prior-art, schematic diagram of a hydronic distribution system having control valves and a differential pressure sensor for monitoring pressure across a portion of the system.

Conventional hydronic distribution systems utilized in many buildings include a variable speed drive that relies on differential pressure measurements within the system to control the speed for one or more variable speed pumps that supply fluid to a chiller or boiler. For example, FIG. 1 shows a prior-art, closed-loop, hydronic, distribution system 10 having a chiller/boiler 12 in fluid communication with two variable speed pumps 14. In turn, the pumps 14 are electronically controlled by a variable speed drive 16 that receives differential pressure information 18 from one or more differential pressure sensors 20. The sensed pressure is the pressure difference between a first point 22 upstream of at least one of the coils 24 and a second point 26 downstream of at least one of the self-regulating valves 28. If the hydronic distribution system 10 operates as a heating system, then hot fluid from the boiler 12 proceeds to cooling coils 24, and conversely if the hydronic distribution system 10 operates as a cooling system, then cool fluid from the chiller 12 proceeds to warming coils 24. A flow controlled bypass 29 valve may also be included to divert fluid from the discharge of the pump(s) to the return line of the chiller or boiler in order to maintain minimum flow through the boiler or chiller at all times.

The pressure sensor 20 typically monitors the differential pressure across the supply and return header 30, but other points of differential pressure measurement are sometimes used, and the pressure information is utilized by the variable speed drive 16 to control the speed of the pumps 14 to maintain the differential pressure within a desired range of a predetermined differential pressure set-point for across the header 30. The pressure set-point is established so that the system 10 will satisfy the required amount of process fluid flow at all loads under all operating conditions.

Control of the pumps to maintain the pressure set-point may be based on a proportional and integral (PI) or proportional, integral and derivative (PID) control loop theory. In typical operation, the monitored differential pressure decreases as the valves 28 open showing more demand for process fluid in the system 10. As a result, the pumps 14 speed up to maintain the set-point pressure and provide the required fluid. If the valves 28 begin to close, then the differential pressure increases, which in turn causes the pumps 14 to slow down in order to maintain the set-point pressure. The illustrated system 10 and associated distribution method using differential pressure is considered the standard method of fluid control through a hydronic distribution system.

BRIEF SUMMARY OF THE INVENTION

A hydronic distribution system includes self-regulating valves and a microprocessor that receives temperature information from the valves, and in turn provides commands to a variable speed drive for controlling the speed of one or more pumps within the system. The microprocessor may also utilize information as to the position of the valves (e.g., open, closed, or somewhere in between) to generate the commands to the variable speed drive. In one embodiment, the microprocessor compares an actual change in position of the valve to determine whether the pump speed should be changed.

In one aspect of the present invention, a hydronic distribution system includes a chiller; a variable speed drive; a variable speed pump in electronic communication with the variable speed drive and in fluid communication with the chiller; a plurality of coils in fluid communication with the chiller; a plurality of self-regulating valves arranged to control an amount of fluid flow from the variable speed pump through each coil; a plurality of sensors respectively cooperating with the plurality of self-regulating valves, the sensors configured to determine a temperature of the fluid leaving the respective valve; and a microprocessor configured to receive the temperatures from the sensors, process the temperatures within an algorithm, to drive the position of the valves to best match the fluid requirement of the coil, The processor will then calculate the required speed of the pump from the position of the valve and provide speed control to the variable speed drive to establish a desired speed of the pump.

In another aspect of the invention, a method for controlling a hydronic distribution system includes the steps of (1) networking a plurality of self-regulating valves to control an amount of fluid flow from at least one variable speed pump to a plurality of coils, wherein the coils are in fluid communication with a chiller that receives fluid from the pump as determined by a variable speed drive; (2) detecting a valve position for each of the valves; (3) transmitting the valve positions to a microprocessor; (4) determining a desired speed of the variable speed pump; and (5) determining an amount of process fluid flow required by the hydronic distribution system.

BRIEF DESCRIPTION OF THE DRAWINGS

Preferred and alternative embodiments of the present invention are described in detail below with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with hydronic distribution systems, the operating components used therein, computing and/or processing systems, various system operational parameters, and methods of operating a hydronic distribution system have not necessarily been shown or described in detail to avoid unnecessarily obscuring descriptions of the embodiments of the invention.

The present method for controlling pump speed in a conventional hydronic distribution system requires differential pressure control in which a pressure sensor typically monitors the differential pressure across the supply and return header or across one of the valves and load at the end of the system. The speed of the pumps are controlled to maintain a particular set-point pressure, which is generally established or predetermined so the system will continually have the necessary amount of process fluid flow at all anticipated loads and under all anticipated operating conditions.

However, one problem in conventional hydronic distribution systems and the conventional methods for controlling pump speed is the set-point pressure is established at a high level to handle the worst case conditions. This high set-point pressure causes excessive pumping energy under more typical or normal operating conditions and also contributes to loss of process fluid energy in cooling systems.

To reduce energy loss at the valves, one embodiment of the present invention provides self-regulating valves networked together and operable to share valve temperature and valve position information with a microprocessor or other type of controller. The microprocessor runs one or more algorithms that process the temperatures and positions of the valves and then compute a desired speed (e.g., lowest speed) for one or more variable speed pumps within the system. Controlling the pumps to operate at their lowest speed and still maintain the correct amount of process fluid flow needed by the system reduces the overall energy use of the hydronic distribution system, saves on the operational lives of the pumps, and increases system efficiency.

Figure 2:
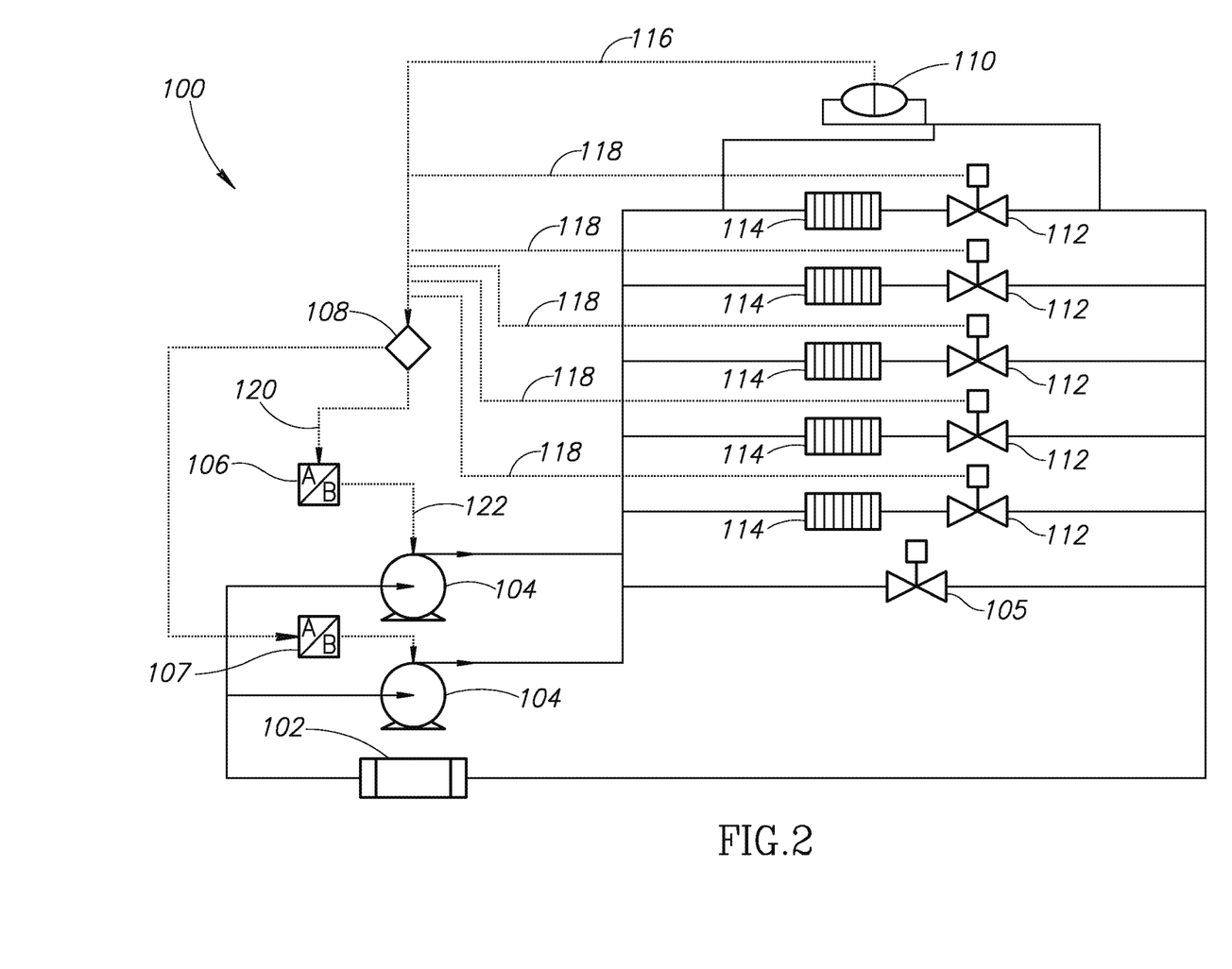
FIG. 2 is a schematic diagram of a hydronic distribution system having self-regulating valves and a microprocessor for receiving temperature information from the valves according to an embodiment of the present invention.

FIG. 2 shows a hydronic distribution system 100 having a chiller/boiler 102 in fluid communication with one or more pumps 104. The system 100 in the illustrated embodiment includes two pumps, but a single pump may be used or more than two pumps depending on the demands of the system 100. A flow controlled bypass valve 105, which may take the form of a three-way valve, may also be included to divert fluid from the discharge of the pump(s) to the return line of the chiller or boiler in order to maintain minimum flow through the boiler or chiller at all times. The speed of each pump 104, and in turn the amount of fluid pumped through the system 100, is governed by variable speed drives 106, 107 which in turn are controlled by a computing device 108, which may preferably take the form of a microprocessor. The microprocessor 108 receives information from a differential pressure sensor 110 and a plurality of self-regulating valves 112 disposed within the system 100. The valves 112 are in fluid communication with a plurality of heating or cooling coils 114, respectively. The sensor 110 and the valves 112 are networked with the microprocessor 108 to communicate pressure information 116 and valve operating information 118 to and from the microprocessor 108.

In the illustrated embodiment, the self-regulating valves 112 provide the valve operating information 118, which may include, but is not limited to, fluid temperatures of the fluid leaving the each valve 112, respectively, which may be compared to a set-point temperature (FIG. 3) to maintain the fluid temperatures within a predetermined temperature range. In addition, the valve operating information 118 may also include valve position information to indicate whether the valve is open, closed, or at some position therebetween. The valve operating information 118 is received by the microprocessor 108 and entered into one or more algorithms programmed into the microprocessor 108. Based on the algorithm or algorithms, the microprocessor 108 transmits one or more signals to the variable speed drive 106 to establish a desired speed for one or both pumps 104 that permits the system 100 to make real time adjustments to various loads while maintaining the correct amount of fluid flow to the system components and throughout the system 100.

The microprocessor 108 operates the variable speed drive 106 to control the speed of the pumps as to maintain a highest possible average valve position while ensuring that no valve is fully open with the load unsatisfied, which is determined by the return fluid temperature information 118. By way of example, if any valve position increases (becomes more open) then the algorithm(s) in the microprocessor 108 determines the percentage position of the valve increasing, and there is a particular weighted value attributed to each valve within the algorithm, so as a valve position increases, the weighted result also increases. These weighted results are summed together to determine pump speed in response to an increased demand for process fluid within the system 100. As such, the microprocessor 108 will produce a signal 120 for the variable speed drive 106, which in turn provides a speed signal 122 to increase the speed of one or both pumps 104.

Alternatively, if any valve position decreases (becomes more closed) then the algorithm in the microprocessor 108 may determine that there is a decreased demand for process fluid in the system 100. In this situation, the microprocessor will produce the signal 120 for the variable speed drive 106, which in turn provides the speed signal 122 to decrease the speed of one or both pumps 104 to meet the demand and provide the required process fluid. This active control of the pumps 104 by continually or at least periodically processing the valve operating information 118 received from the networked valves 112 may provide a more optimum and more efficient method of fluid control through the hydronic distribution system 100. The decreased demand may be determined by the percentage position of the valve closing, and there is a particular weighted value attributed to each valve within the algorithm, so as a valve position decreases the weighted result also decreases. These weighted results from each valve are summed together to a lower determine pump speed.

Figure 3:
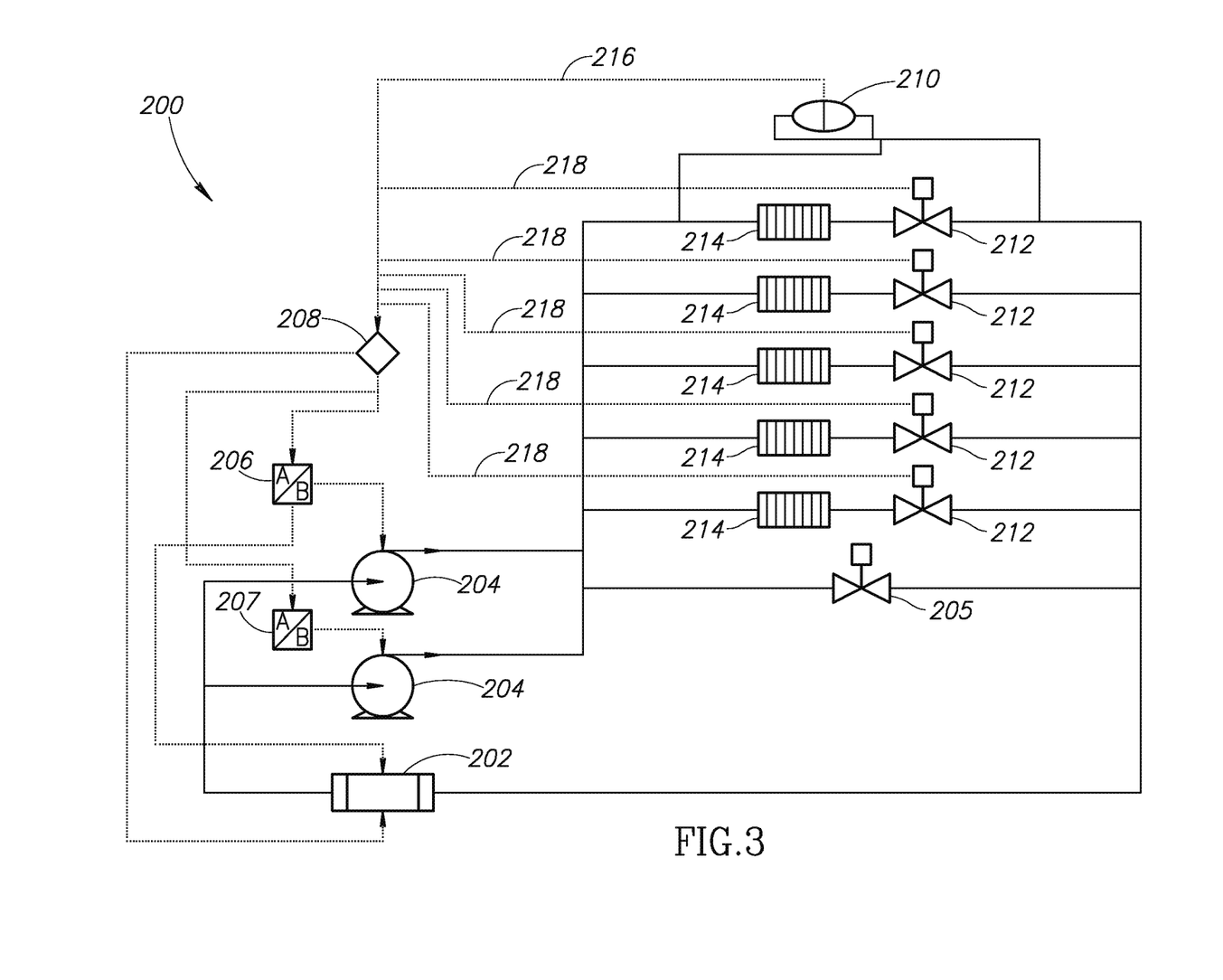
FIG. 3 is a schematic diagram of a hydronic distribution system having self-regulating valves, a microprocessor for receiving temperature information from the valves, and a reference set-point temperature for the system according to an embodiment of the present invention.

FIG. 3 shows another hydronic distribution system 200 that is configured and operates similar to the hydronic distribution system 100 described above. As such, the reference numerals of the similar components are merely incremented by "one hundred" and they are not described in detail herein. In the illustrated embodiment, the networked, self-regulating valves 212 provide the valve operating information 218 to the microprocessor 208 for controlling the variable speed drive 206, which in turn governs the speed of the pumps 204. A flow controlled bypass valve 205, which may take the form of a three-way valve, may also be included to divert fluid from the discharge of the pump(s) to the return line of the chiller or boiler in order to maintain minimum flow through the boiler or chiller at all times. The speed of each pump 204, and in turn the amount of fluid pumped through the system 200, is governed by variable speed drives 206, 207 which in turn are controlled by a computing device 208, which may preferably take the form of a microprocessor.

The system 200 includes a second algorithm, module or program accessible by the microprocessor 208 that determines a desired set-point temperature for the process fluid while the aforementioned algorithm determines and controls the pump speed based on the networked valves 212 and corresponding valve information 218. More specifically, the microprocessor 208 in the illustrated embodiment utilizes one or more algorithms to determine an optimum process fluid temperature from a result of a speed set-point.

In operation, the valves 212 forward or the microprocessor 208 requests the valve operating information 218 from one or more of the valves, but preferably from each valve in the system 200. The information 218 is processed to determine one or more operating parameters for the variable speed drive 206, which runs the pump 204 to maintain a desired amount of fluid flow through the system 200. The result of the speed determination algorithm is fed into a temperature optimization algorithm within the microprocessor 208 to determine the appropriate temperature of the process fluid and forward that temperature information to the appropriate component, such as the chiller/boiler 202. Conversely, in alternate embodiments, a temperature optimization algorithm within the microprocessor 208 generates results which are then provided to the speed determination algorithm to determine the appropriate temperature of the process fluid and forward that temperature information to the appropriate component, such as the chiller/boiler 202.

The microprocessor 208 determines which valves 212 are being commanded to fully open, but are not yet fully open due to valve self-ranging. In addition, the microprocessor 208 determines if the pump speed is low enough in that it would be more efficient to increase the speed to the pump than to adjust the set point to the chiller or boiler 202. If so, then the microprocessor 208 provides a signal to change a threshold temperature of one or more of the valves 212 to selectively increase fluid flow. If the reverse is true, the set-point temperature of the fluid is adjusted to provide more energy per unit of fluid. Generally, anytime one of the fluid paths includes a valve with its threshold temperature adjusted beyond an initial setting and the fluid does not require additional cooling, then its threshold temperature may be slowly restored to its normal, nominal or original setting. If the microprocessor 208 does not determine that any of the valves 212 are being commanded to fully open and determines that it is more efficient to reduce energy within the system, then the fluid temperature of the system 200 may be slowly adjusted to increase an overall efficiency of the system 200.

As one or more of the valves 212 open, the microprocessor 208 determines that there is more demand for process fluid in the system 200, and subsequently provides a signal to the variable speed drive 206 to increase the pump speed to meet the fluid flow demand. The result of one algorithm may be accessed by another algorithm within the microprocessor 208, where the latter algorithm determines the appropriate temperature of the process fluid. Conversely, as one or more of the valves 212 close, the microprocessor 208 may determine that there is less demand for process fluid in the system 200, and subsequently provides a signal to the variable speed drive 206 to decrease the pump speed to reduce power while still providing an appropriate amount of fluid flow through the system 200.

Figure 4A:
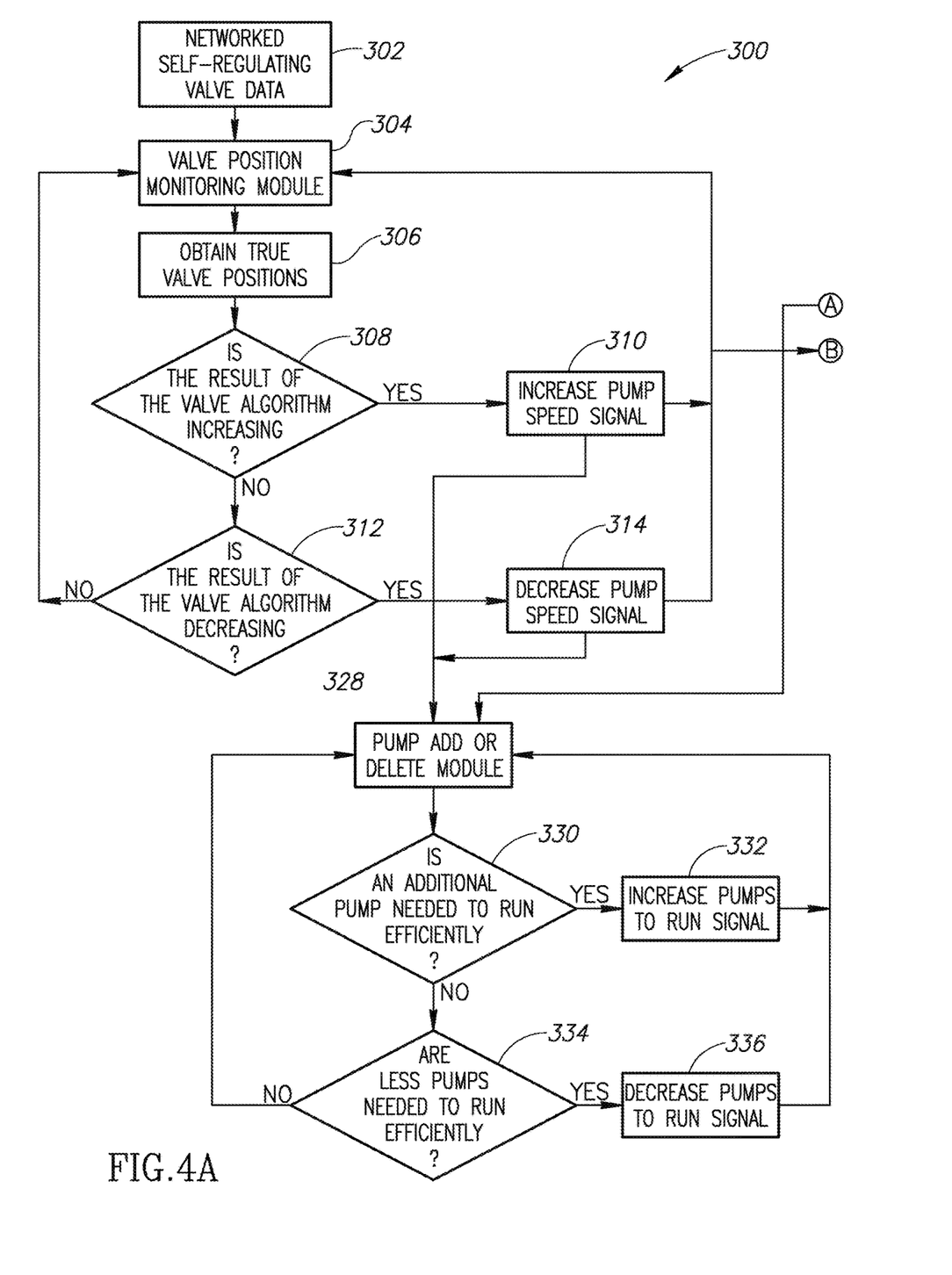
FIGS. 4A and 4B are flow diagrams of an algorithm for a hydronic distribution system according to an embodiment of the present invention.
Figure 4B:
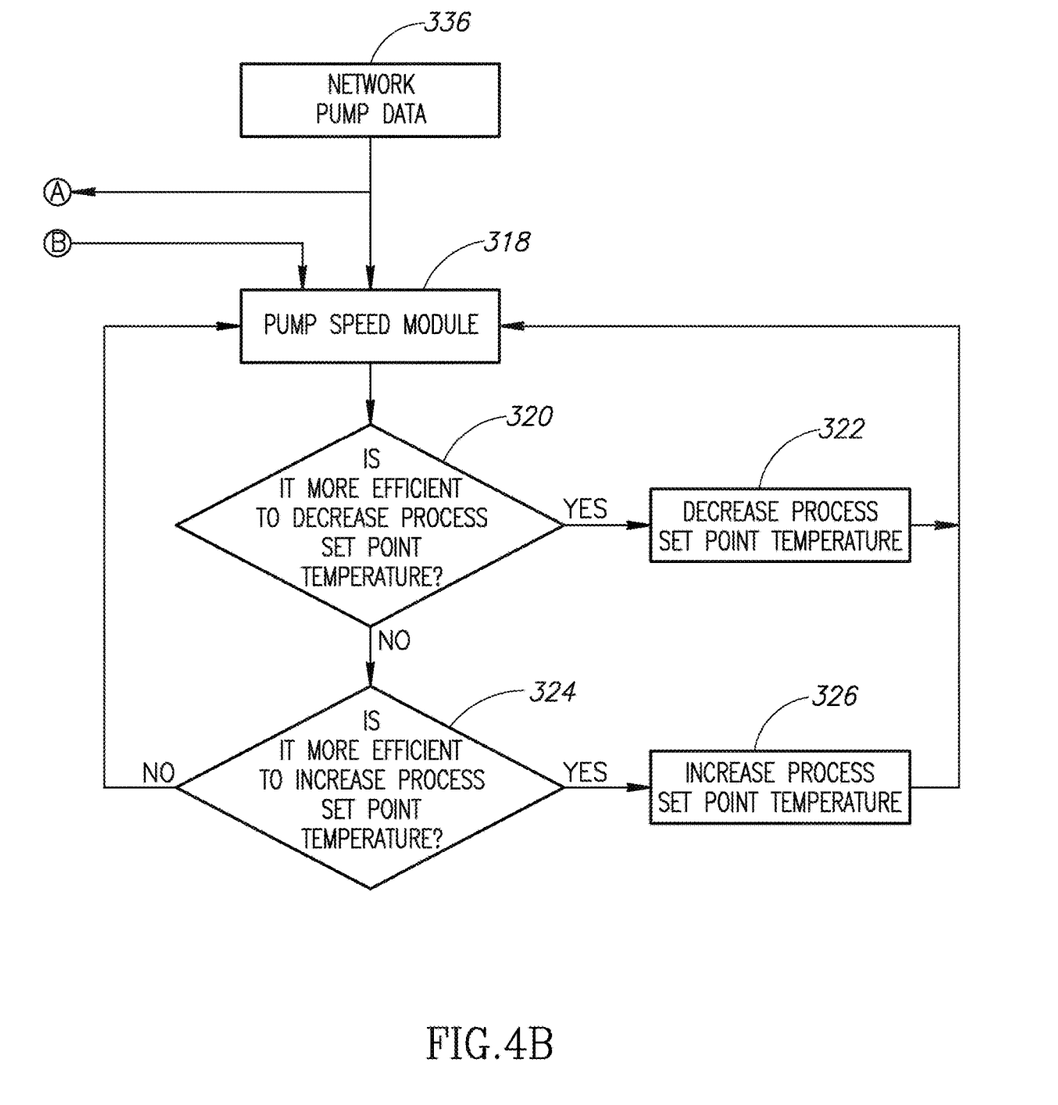

FIG. 4 shows a flow diagram for an algorithm 300 used to control a hydronic distribution system, such as those described above, according to an embodiment of the present invention. At step 302, data is obtained from a plurality of self-regulating valves arranged in a network and the data is provided to a valve position monitoring module 304 that monitors the self-regulating valves based on the data and based on various feedback signals. At step 306, true (e.g., real time) valve positions are obtained from one or more of the self-regulating valves. At step 308, the valve position monitoring module 304 determines whether the position of one or more of the self-regulating valves is increasing (e.g., opening). If yes, then at step 310 the valve position monitoring module 304 provides a signal to one or more pumps to increase the pump speed by a desired amount in correspondence with the increase of valve position. If no, meaning the position of one or more of the self-regulating valves is not increasing, then at step 312 the processor determines whether the valve position is decreasing (e.g., closing). If yes for step 312, then at step 314 the processor provides a signal to one or more pumps to decrease the pump speed by a desired amount in correspondence with the decrease of valve position.

Contemporaneously at step 316, data from one or more pumps is obtained and provided to a pump speed module 318. At step 320, the pump speed module determines whether it is more efficient to decrease a process set-point temperature. If yes, then at step 322 a signal or other communication is provided to the system to decrease the process set-point temperature. If no at step 320, then at step 324 the pump speed module determines whether it is more efficient to increase the process set-point temperature. If yes, then at step 326 a signal or other communication is provided to the system to increase the process set-point temperature. If no at step 324 then the module 318 runs through the process again.

At step 328, a pump add or delete module utilizes information from the valve position monitoring module 304 and the networked pump data 316 to determine whether additional pumps need to be brought online or taken offline. At step 330, the pump add or delete module determines whether an additional pump should be brought online to increase the efficiency of the system. If yes, then at step 332 the additional one or more pumps are brought online. At step 334, the pump add or delete module determines whether on or more pumps should be taken offline to increase the efficiency of the system. If yes, then at step 336 one or more pumps are brought offline.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A computer-readable medium on which are stored instructions that, when executed by a microprocessor, enable the microprocessor to perform a method of controlling a hydronic distribution system, the method comprising the steps of:

obtaining in real time, from one or more of a plurality of self-regulating valves arranged in a network, valve information characterizing the respective position of the one or more self-regulating valves;

determining from at least a portion of the valve information whether the position of one or more of the self-regulating valves is increasing;

if the position of one or more of the self-regulating valves is determined to be increasing, providing a signal to one or more pumps to increase the speed of the one or more pumps by an amount corresponding to the amount of increase of the position of the one or more self-regulating valves;

if the position of one or more of the self-regulating valves is determined to be not increasing, determining whether the position of the one or more valves is decreasing;

if the position of the one or more valves is decreasing, providing a signal to the one or more pumps to decrease the speed of the one or more pumps of a set of pumps by an amount corresponding to the amount of decrease of the position of the one or more self-regulating valves.

2. The medium of claim 1, wherein the steps further comprise obtaining pump information from the one or more pumps, wherein the pump information comprises at least one of speed and power draw.

3. The medium of claim 2, wherein the steps of providing a signal to the one or more pumps to decrease the speed of the one or more pumps of a set of pumps by an amount corresponding to the amount of decrease of the position of the one or more self-regulating valves and obtaining pump information from the one or more pumps are performed contemporaneously.

4. The medium of claim 1, wherein determining step comprises determining from the at least a portion of the valve information whether the position of the one or more of the self-regulating valves is in a process of increasing.

5. A system for controlling a hydronic distribution system, the system comprising:

a module configured to obtain in real time, from one or more of a plurality of self-regulating valves arranged in a network, valve information characterizing the respective position of the one or more self-regulating valves, determine from at least a portion of the valve information whether the position of one or more of the self-regulating valves is increasing, provide a signal, if the position of one or more of the self-regulating valves is determined to be increasing, to one or more pumps to increase the speed of the one or more pumps by an amount corresponding to the amount of increase of the position of the one or more self-regulating valves, determine, if the position of one or more of the self-regulating valves is determined to be not increasing, whether the position of the one or more valves is decreasing, and provide, if the position of the one or more valves is decreasing, a signal to the one or more pumps to decrease the speed of the one or more pumps of a set of pumps by an amount corresponding to the amount of decrease of the position of the one or more self-regulating valves.

* * * * *